(12) United States Patent
Noh et al.

(10) Patent No.: US 10,794,305 B2
(45) Date of Patent: Oct. 6, 2020

(54) VALVE DUTY DIFFERENTIATED EXHAUST GAS RECIRCULATION CONTROL METHOD AND EXHAUST GAS RECIRCULATION SYSTEM

(71) Applicants: HYUNDAI MOTOR COMPANY, Seoul (KR); KIA MOTORS CORPORATION, Seoul (KR)

(72) Inventors: Hyun-Woo Noh, Gwacheon-Si (KR); Jin-Suk Kang, Seoul (KR); Ki-Min Park, Ansan-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/197,970

(22) Filed: Nov. 21, 2018

(65) Prior Publication Data

US 2020/0018250 A1    Jan. 16, 2020

(30) Foreign Application Priority Data

Jul. 12, 2018    (KR) ........................ 10-2018-0081083

(51) Int. Cl.
*F02D 41/00* (2006.01)
*F02D 41/14* (2006.01)

(52) U.S. Cl.
CPC ..... *F02D 41/0052* (2013.01); *F02D 41/1455* (2013.01); *F02D 2200/021* (2013.01); *F02D 2200/50* (2013.01); *F02D 2200/703* (2013.01)

(58) Field of Classification Search
CPC .. F02D 41/00; F02D 41/0052; F02D 41/1455; F02D 2200/021; F02D 2200/50; F02D 2200/703
See application file for complete search history.

(56) References Cited

U.S. PATENT DOCUMENTS 5,918,582 A    7/1999  Itoyama et al.
6,725,832 B2 *  4/2004  Yokoyama .......... F02B 23/0672
                                                       123/396

FOREIGN PATENT DOCUMENTS

| DE | 10208426 A1 | 9/2002 | |
| DE | 102017109464 A | 6/2018 | |
| EP | 1031719 A2 | 8/2000 | |
| JP | 2000097011 A * | 4/2000 | ............... F01N 3/02 |
| JP | 2005048775 A * | 2/2005 | ............. F02D 21/08 |

(Continued)

OTHER PUBLICATIONS

Extended European Search Report dated Apr. 26, 2019 issued in European Patent Application No. 18206924.5.

*Primary Examiner* — Hieu T Vo

(74) *Attorney, Agent, or Firm* — Morgan, Lewis & Bockius LLP

(57) ABSTRACT

An exhaust gas recirculation (EGR) control method includes a valve duty differentiated control including: detecting, by a controller, an engine operation region, a mixer region, and an external factor region as a valve control condition for an EGR valve duty correction variable for controlling an EGR system; applying, by the controller, the EGR valve duty correction variable to an EGR valve duty, which is set by a target air amount to an intake air amount, to calculate a minimum EGR valve duty; and outputting, by the controller, the calculated minimum EGR valve duty to an EGR valve as the EGR valve duty.

18 Claims, 14 Drawing Sheets

(56) References Cited

FOREIGN PATENT DOCUMENTS

| JP | 4169237 B2 | 10/2008 |
| JP | 4222167 B2 | 2/2009 |
| JP | 2009-209748 A | 9/2009 |
| JP | 4710666 B2 | 6/2011 |
| JP | 2017-141793 A | 8/2017 |

\* cited by examiner

VALVE DUTY DIFFERENTIATED EXHAUST GAS RECIRCULATION CONTROL METHOD AND EXHAUST GAS RECIRCULATION SYSTEM

CROSS-REFERENCE TO RELATED APPLICATION

This application claims priority to Korean Patent Application No. 10-2018-0081083, filed on Jul. 12, 2018, which is incorporated herein by reference in its entirety.

TECHNICAL FIELD

The present disclosure relates to an exhaust gas recirculation (EGR) control, and more particularly, to an EGR system in which an EGR control is performed by differentiating a value of a valve duty using an EGR valve duty correction variable.

BACKGROUND

Generally, an exhaust gas recirculation (EGR) system applied to a vehicle contributes to the performance enhancement and fuel efficiency enhancement of an engine together with the high output thereof by supplying the EGR in addition to increasing an air supply amount by compressing an intake air.

In the EGR system, an EGR valve provided in an EGR line extending from the front end of a turbine of a turbocharger to an intake manifold is controlled by an electronic control unit (ECU), and the EGR is supplied by an EGR gas that a part of the exhaust gases, which are generated in the engine to exit an exhaust manifold and exit at the turbocharger side, is mixed with an intake air depending upon opening/closing degree of the EGR valve.

Accordingly, the EGR system performs an EGR control by following the air amount depending upon the combustion condition of the engine, and the EGR control following the target air amount is suitable for a diesel engine in which nitrogen oxides such as NOx should be reduced.

For example, the EGR control following the target air amount calculates the target air amount depending upon a crank position sensor and the opening of an acceleration pedal, and an engine speed and a fuel injection amount, and compares a feedback intake air amount sensor signal with the calculated target air amount to control a pulse width modulation (PWM) duty of the EGR valve, thus following the target air amount in which the intake air amount is calculated.

Accordingly, the EGR system can comply with the emission regulations for NOx and CO/HC required for a diesel engine vehicle.

However, since the EGR control of the EGR system does not have flexibility in controlling the EGR valve, the generation of NOx can be increased even though the target air amount is followed to reduce the generation of NOx. This phenomenon is because the EGR valve is controlled to be completely closed despite that the current measured air amount is lower than the target air amount upon EGR control to close the EGR control.

As an example, the flexibility insufficiency phenomenon of the EGR valve control is caused in acceleration condition and rapid acceleration condition of the vehicle. That is, the acceleration condition and rapid acceleration condition delay the formation of boost pressure (the average pressure in an intake pipe of an engine intake system) by the turbo lag (acceleration response delay) of turbocharger, and the insufficient state of boost pressure is developed to the case where the intake air amount does not reach compared to an increase in the target air amount in the high fuel injection amount condition. As described above, the EGR valve, which is simply controlled by feedback of the target air amount in the state that the actual air amount is lower than the target air amount due to the insufficient boost pressure, is switched to the completely closed state depending upon the lack of the intake air amount. As a result, although the EGR system interrupts the EGR supply for the engine to perform the EGR control for following the target air amount, the state of the NOx peak (the maximum value) that the NOx concentration in the exhaust gas instantaneously surges in the engine is inevitably caused.

As another example, the flexibility insufficiency phenomenon of the EGR valve control is caused in the condition that a ratio of the air/fuel in a cylinder of the engine is over-rich. That is, the EGR valve duty should be lower than a setting value so that the EGR valve is opened much in the over-rich condition of the ratio of the air/fuel, but the EGR valve duty cannot be adjusted, such that torque reduction and over-smoke due to the combustion instability are inevitably caused.

As yet another example, the flexibility insufficiency phenomenon of the EGR valve control is caused in the operation condition of the vehicle. That is, the operation condition of the vehicle, which is changed depending upon the cold state of the engine having a low cooling water temperature, the air-lean environmental condition such as high latitude, a change in a gear stage causing a difference of the rising speed of the engine speed, etc., requires a change in the opening/closing degree of the EGR valve, but the engine performance can be inevitably reduced because the EGR valve duty cannot be adjusted.

The contents described in description of related art are to help the understanding of the background of the present disclosure, and can include what is not previously known to those skilled in the art to which the present disclosure pertains.

SUMMARY OF THE DISCLOSURE

An object of the present disclosure is to provide a valve duty differentiated EGR control method and a valve duty differentiated EGR system, which apply each of an operation region condition, a mixer condition, and an external factor condition as an EGR valve duty correction variable to perform EGR valve duty correction by dualization of an EGR valve duty of the operation region condition, e minimization of the EGR valve duty of the mixer condition, a change in the EGR valve duty of the external factor condition, thus preventing EGR supply interruption which excessively generates NOx and further preventing combustion instability causing torque reduction and over-smoke phenomenon.

An exhaust gas recirculation (EGR) control method according to an exemplary embodiment of the present disclosure includes: a valve duty differentiated control including: detecting, by a controller, an engine operation region, a mixer region, and an external factor region as a valve control condition for an EGR valve duty correction variable for controlling an EGR system; applying, by the controller, the EGR valve duty correction variable to an EGR valve duty, which is set by a target air amount to an intake air amount, to calculate a minimum EGR valve duty, and outputting, by the controller, the calculated minimum EGR valve duty to an EGR valve as the EGR valve duty.

The engine operation region may use acceleration or rapid acceleration as a condition, the mixer region may use the over-rich of the air-fuel in a cylinder of an engine as a condition, and the external factor region may use cooling water temperature, high latitude, and a gear stage as a condition.

The valve duty differentiated control may be classified into a condition control for calculating the EGR valve duty correction variable in each of the engine operation region, the mixer region, and the external factor region, a valve duty selection control using an engine operation range suitable for a setting fuel amount, and a valve duty reliability establishment control using the engine operation range out of the setting fuel amount.

The condition control may be classified into an operation region condition control that calculates the EGR valve duty correction variable in the engine operation region, a mixer condition control that calculates the EGR valve duty correction variable in the mixer region, and an external factor condition control that calculates the EGR valve duty correction variable in the external factor region. The operation region condition control may calculate a target air amount EGR valve duty, a minimum opening EGR valve duty, an engine operation region EGR valve duty, and an EGR valve lambda target duty as the EGR valve duty correction variable; the mixer condition control may calculate a lambda duty correction coefficient as the EGR valve duty correction variables; and the external factor condition control may calculate an atmospheric pressure duty correction coefficient, a cooling water temperature duty correction coefficient, and a gear stage duty correction coefficient as the EGR valve duty correction variables.

The operation region condition control may perform detecting the engine operation region by calculating a driver demand torque by the location of an acceleration pedal, setting the EGR valve duty by the target air amount to the intake air amount by comparing the target air amount determined in the engine operation region with the current air amount, determining the minimum opening EGR valve duty that the effective cross-sectional area of the EGR supply line is not completely closed by the EGR valve in the engine operation region and further determining the engine operation region EGR valve duty depending upon the engine operation region, and determining the engine operation range depending upon the setting fuel amount by converting the engine operation region EGR valve duty into the full load operation range lambda correction value by the lambda duty correction coefficient of the mixer condition control.

The mixer condition control may perform determining the lambda sensor activation using a dew point, setting a lambda sensor value applying a lambda sensor signal or a lambda calculation value applying the air amount sensor signal and the fuel injection amount, and calculating and outputting the lambda duty correction coefficient by the lambda sensor value or the lambda calculation value.

The external factor condition control may perform calculating and outputting an atmospheric pressure duty correction coefficient depending upon the detected atmospheric pressure, calculating and outputting the cooling water temperature duty correction coefficient depending upon the detected cooling water temperature, and calculating and outputting the gear stage duty correction coefficient depending upon the detected gear stage.

The valve duty selection control may perform calculating the minimum EGR valve duty by applying the EGR valve duty correction variable, determining whether or not the EGR valve duty and the minimum EGR valve duty are applied, and determining and outputting the EGR valve duty or the minimum EGR valve duty.

The minimum EGR valve duty may apply the minimum opening EGR valve duty of the operation region condition control, the lambda duty correction coefficient of the mixer condition control, the atmospheric pressure duty correction coefficient of the external factor condition control, the cooling water temperature duty correction coefficient, and the gear stage duty correction coefficient. The minimum EGR valve duty may be calculated by multiplying the minimum opening EGR valve duty, the lambda duty correction coefficient, the atmospheric pressure duty correction coefficient, the cooling water temperature duty correction coefficient, and the gear stage duty correction coefficient altogether. The EGR valve duty and the minimum EGR valve duty may be determined to apply a large value with respect to each other.

The valve duty reliability establishment control may be classified into a lambda duty control that the engine operation range is applied and an EGR control mode is considered to output the EGR valve lambda target duty to the EGR valve, and a target duty control that the engine operation range may not be applied and the EGR control mode is considered to output the EGR value duty to the valve duty selection control.

The lambda duty control may perform determining the EGR control mode by an EGR control mode invariant condition and an EGR control mode change condition, confirming the profile before/after the EGR control mode change in the EGR control mode change condition, outputting the EGR valve lambda target duty by the engine operation region EGR valve duty of the operation region condition control and the lambda duty correction coefficient of the mixer condition control among the condition controls in the EGR control mode invariant condition or the non-existence condition of the profile before/after the EGR control mode change, and changing the EGR valve duty into the EGR valve lambda target duty in the existence condition of the profile before/after the EGR control mode change. The EGR valve duty may be changed into the EGR valve lambda target duty by multiplying the engine operation region EGR valve duty and the lambda duty correction coefficient of the mixer condition control.

The target duty control may perform determining the EGR control mode by an EGR control mode invariant condition and an EGR control mode change condition, confirming the profile before/after the EGR control mode change in the EGR control mode change condition, outputting the EGR valve duty in the EGR control mode invariant condition or the non-existence condition of the profile before/after the EGR control mode change, and changing the EGR valve lambda target duty into the EGR valve duty in the existence condition of the profile before/after the EGR control mode change. The EGR valve lambda target duty may be changed into the EGR valve duty by multiplying the engine operation region EGR valve duty and the lambda duty correction coefficient of the mixer condition control.

An exhaust gas recirculation (EGR) system according to another exemplary embodiment of the present disclosure includes: a controller for implementing a valve duty differentiated control which detects an operation region to which acceleration is applied, a mixer region to which the rich of air-fuel is applied, and an external factor region to which a cooling water temperature, a high latitude, and a gear stage are applied as a valve control condition, respectively, and which calculates an EGR valve duty, which is set by a target air amount to an intake air amount by a minimum EGR valve duty depending upon the valve control condition to apply the EGR valve duty for an EGR valve.

The controller may include an operation region condition control map, a mixer condition control map, and an external factor condition control map; and the operation region condition control map may be provided with a target air amount EGR valve duty (A), an engine operation region EGR valve duty (C), and a minimum opening EGR valve duty (B) as a table, the mixer condition control map may be provided with a lambda value for the over-rich of a ratio of the air/fuel as a table, and the external factor condition control map may be provided with cooling water temperature, an air amount, and a gear stage as a table.

The controller may be connected with a sensor, and the sensor may include an Accelerator Pedal Sensor (APS) for detecting the stroke of an acceleration pedal, a crank position sensor for detecting the rotation location of a crankshaft of an engine, an air amount sensor for detecting fresh air of an intake line connected to the engine, an EGR valve position sensor for detecting the valve opening location of the EGR valve, a lambda sensor for detecting an exhaust gas component of an exhaust line connected to the engine, an injector sensor for detecting the fuel injected into a cylinder of the engine, an atmospheric pressure sensor for detecting atmospheric pressure around a vehicle, a cooling water temperature sensor for detecting cooling water temperature flowing through the cylinder block of the engine, and a shifting sensor for detecting a shifting stage depending upon the operation of a shifting lever.

The EGR system of the present disclosure can perform the EGR control by the valve duty differentiated scheme, thus implementing the following operations and effects.

First, it is possible to implement the dualization of the EGR valve duty by the minimum EGR valve duty for each operation region, thus preventing the EGR valve from being completely closed due to the minimum setting duty. Second, it is possible to prevent the EGR supply from being interrupted during the engine operation increasing NOx due to the minimum setting duty by the dualization of the EGR valve duty. Third, it is possible to maintain the minimum EGR valve duty even in acceleration/rapid acceleration conditions of the engine, thus enhancing performance of the exhaust gas by reducing the NOx Peak phenomenon caused by the existing EGR supply interruption. Fourth, it is possible to correct the minimum duty value of the EGR valve by monitoring the lambda value of the engine combustion, thus reflecting a mixture ratio of the fuel/air in the cylinder to the adjustment of the EGR valve. Fifth, it is possible to prevent the combustion instability causing the torque reduction and the over-smoke during engine operation by correcting the minimum duty value of the EGR valve duty. Sixth, it is possible to use as the EGR valve duty correction variable the difference of the rising speed of the engine speed depending upon the cold state of the engine having a low cooling water temperature or the air-lean environment condition such as high latitude and a gear stage, thus preventing the engine performance from being reduced during the engine operation.

DESCRIPTION OF SPECIFIC EMBODIMENTS

Hereinafter, an embodiment of the present disclosure will be described in detail with reference to the accompanying drawings, and the embodiment is one example and those skilled in the art to which the present disclosure pertains can implement in many various forms, such that the present disclosure should be not limited to the embodiment described herein.

Figure 1:
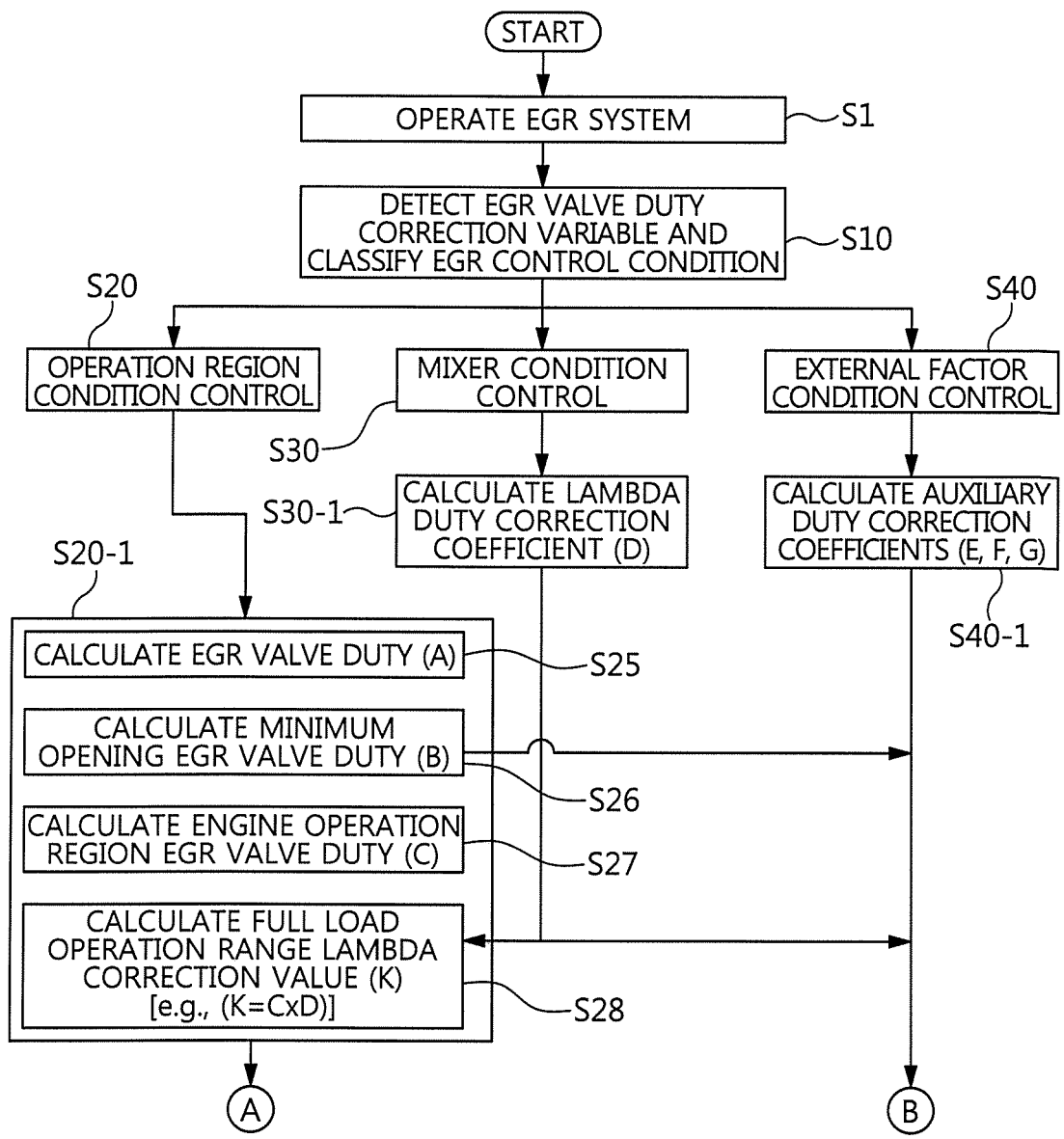
FIGS. 1 and 2 are flowcharts of a valve duty differentiated exhaust gas recirculation (EGR) control method in accordance with an exemplary embodiment of the present disclosure.
Figure 2:
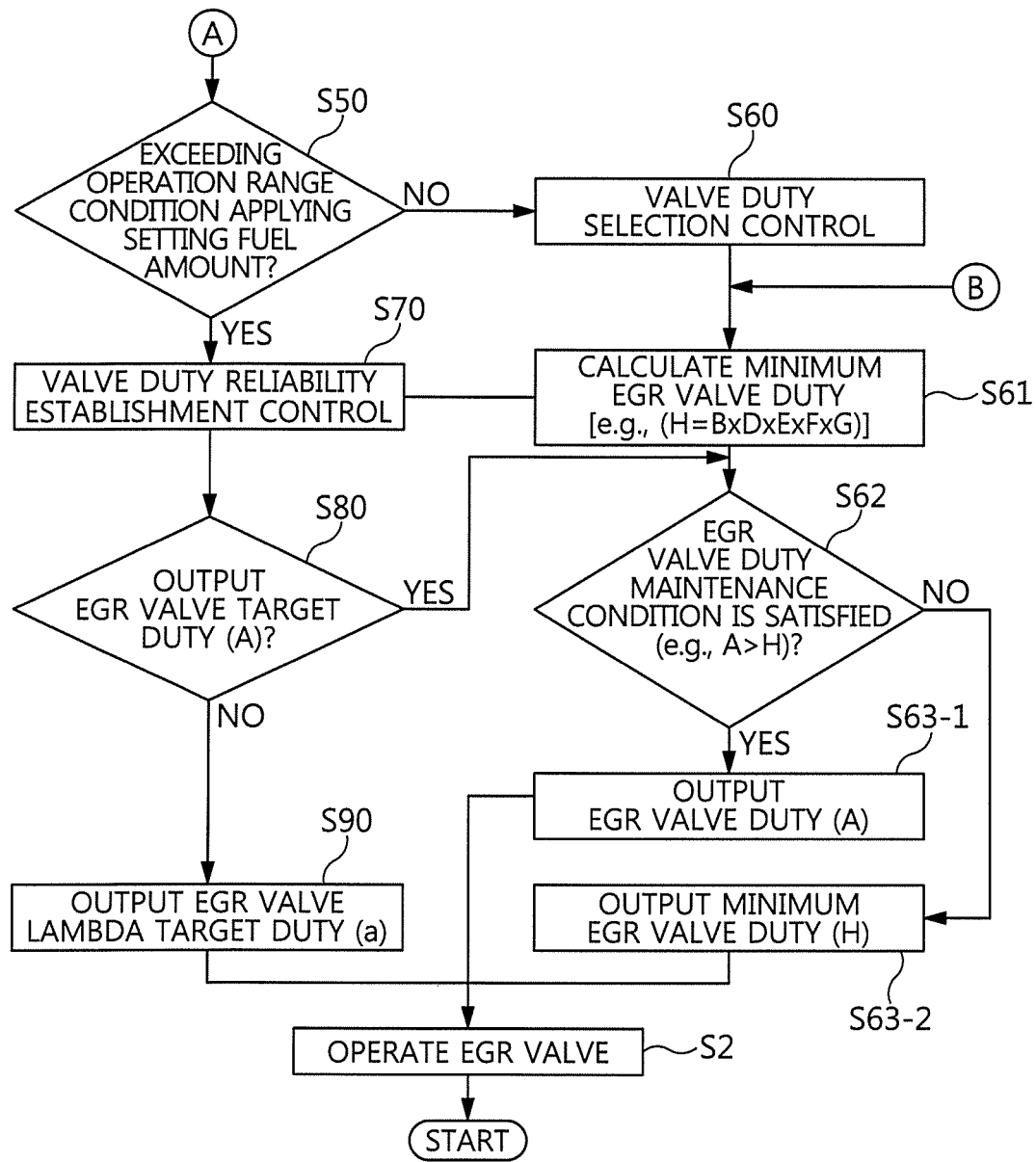

Referring to FIGS. 1 and 2, an exhaust gas recirculation (EGR) control method an exemplary embodiment of classifies operation region/mixer/external factor condition controls S20 to S40 by an EGR valve duty correction variable S10 detected between the operation of an EGR system S1 and the operation of an EGR valve S2, and then performs valve duty selection controls S60 to S63-2 or valve duty reliability establishment controls S70 to S90 depending upon determining a full load operation range S50 that the full load performance of an engine is considered depending upon a setting fuel amount. Accordingly, the EGR control method can be implemented by a valve duty differentiated EGR control method characterized by a valve duty differentiated control.

Particularly, each of the operation region/mixer/external factor condition controls S20 to S40 is corrected depending upon the EGR valve duty correction variable classified into acceleration/rapid acceleration conditions, an air/fuel rich condition, an engine cold condition, an environmental condition, and a gear stage condition, thus preventing the phenomena of combustion instability, torque reduction, and over-smoke even in any operation condition, and further preventing NOx Peak from being generated due to the EGR supply interruption.

For example, the operation region condition control S20 dualizes the minimum duty of the EGR valve, which is set for each operation region, in order to prevent the EGR valve from being completely closed when an intake air amount is lower than a target air amount upon occurrence of a boost delay due to a turbo rack in the acceleration/rapid acceleration and thereby the EGR valve is closed, into a minimum opening EGR valve duty, thus preventing the phenomenon of the EGR supply interruption to improve the phenomenon of the NOx Peak.

For example, the mixer condition control S30 monitors a ratio of air to fuel in a cylinder of the engine by an activated lambda sensor instead of a lambda correction scheme with respect to the lambda calculated by an air amount sensor and a fuel injection amount performed before the lambda sensor is activated, and in the over-rich condition therefrom, corrects the minimum opening EGR valve duty, thus preventing excessive torque reduction and smoke generation. Accordingly, the mixer condition control S30 reflects the fuel amount changed in various environmental conditions during the full load operation by a change in the lambda value so that a certain EGR valve opening minimum duty is maintained, thus enhancing the safety of the EGR supply.

For example, the external factor condition control S40 corrects the minimum opening EGR valve duty in the cold condition that cooling water temperature is low, thus resolving combustion instability due to the cold condition, corrects the minimum opening EGR valve duty in the high altitude condition that air is lean due to low atmospheric pressure, thus preventing torque reduction and smoke generation caused by the over-rich due to a lack of air amount, and corrects the minimum opening EGR valve duty in the gear stage condition that the acceleration/deceleration degree of the engine is changed, thus preventing torque reduction and smoke generation caused by the acceleration/deceleration degree. Accordingly, the external factor condition control S40 reflects a difference of the rising speed of the engine speed depending upon the cold state that cooling water temperature is low or the environmental condition that air is lean such as high altitude and the gear stage so that a certain EGR valve duty opening minimum duty is maintained, thus enhancing the safety of the EGR supply.

Accordingly, the valve duty differentiated EGR control method completely resolves the disadvantage in that the existing EGR control has performed the EGR valve duty control by the target air amount to cause the EGR supply interruption with respect to the engine.

Figure 3:
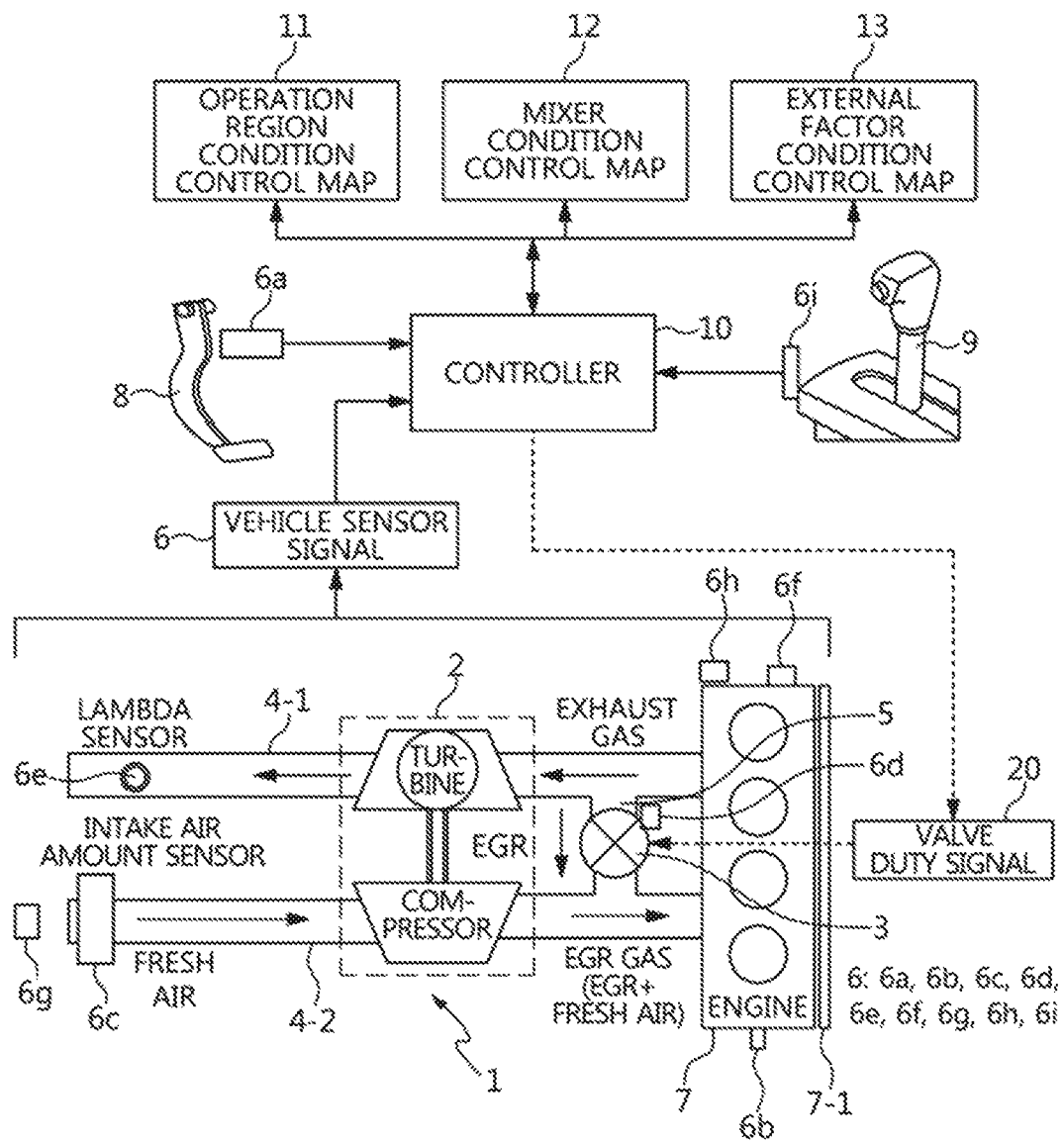
FIG. 3 is a block diagram of an EGR system for performing a valve duty differentiated EGR control in accordance with an exemplary embodiment of the present disclosure.

Referring to FIG. 3, an exhaust gas recirculation (EGR) system 1 according to an exemplary embodiment of the present disclosure includes a turbocharger 2, an EGR valve 3, a sensor 6, and a controller 10. In this case, the EGR system 1 may be a high pressure-EGR system that delivers EGR to an EGR supply line 5 connected to an intake line 4-2 through an EGR cooler (not illustrated) to mix it with fresh air, but can be also applied identically to a low pressure-EGR system that bypasses a part of the exhaust gas purified through a catalyst to the turbocharger 2 to mix it with fresh air.

Specifically, the turbocharger 2 includes a turbine located in an exhaust line 4-1 coming from the engine 7 and a compressor located in the intake line 4-2 connected to the engine 7, and the turbine can be rotated by the exhaust gas to rotate the compressor for compressing fresh air. The EGR valve 3 is operated so that a part of the exhaust gas flowing from the engine 7 through the exhaust line 4-1 is discharged to the EGR by the pressure difference between the front end of the turbine and the rear end of the compressor to be branched from the exhaust line 4-1 to the intake line 4-2, and the effective cross-sectional area of the EGR supply line 5 is adjusted by a control of the controller 10 in order to adjust the EGR gas amount flowing out from the exhaust line 4-1 to the intake line 4-2. For this purpose, the EGR valve 3 may include an actuator that is installed in the EGR supply line 5 connecting the exhaust line 4-1 and the intake line 4-2, and may response to a control signal of the controller 10. Here, the controller 10 may be an electronic control unit (ECU).

Specifically, the sensor 6 includes an Accelerator Pedal Sensor or an Accelerator Pedal Scope (APS) 6a, a crank position sensor 6b, an air amount sensor 6c, an EGR valve position sensor 6d, a lambda sensor 6e, an injector sensor 6f, an atmospheric pressure sensor 6g, a cooling water temperature sensor 6h, and a shifting sensor 6i, and is connected with the controller 10 via a CAN network to transmit a detection signal to the controller 10.

For example, the APS 6a detects a stroke depending upon the operation of an acceleration pedal 8. The crank position sensor 6b detects the rotation location of the crankshaft of the engine 7. The air amount sensor 6c detects fresh air flowed into the intake line 4-2. The EGR valve position sensor 6d detects the valve opening location of the EGR valve 3. The lambda sensor 6e detects an exhaust gas component flowing through the exhaust line 4-1, and is not activated before reaching dew point (temperature that saturation is occurred when a given air volume is cooled at a certain pressure and a certain vapor content) and is activated when reaching the dew point to generate the detection signal. The injector sensor 6f detects the operation of an injector 7-1 for injecting fuel into the cylinder (i.e., the cylinder) of the engine 7. The atmospheric pressure sensor 6g detects atmospheric pressure around the vehicle. The cooling water temperature sensor 6h detects the cooling water temperature flowing through the cylinder block of the engine 7. The shifting sensor 6i detects the shifting stage (i.e., the gear stage) depending upon the operation of a shifting lever 9.

Specifically, the controller 10 includes an operation region condition control map 11, a mixer condition control map 12, an external factor condition control map 13, and a duty output unit 20, and uses a signal of the sensor 6 as the input data to adjust the effective cross-sectional area of the EGR gas passage with respect to the EGR supply line 5 by controlling the actuator of the EGR valve 3.

For example, the operation region condition control map 11 is provided with an EGR valve duty dualization table of the target air amount EGR valve duty and the engine operation region EGR valve duty in order to resolve the acceleration/rapid acceleration condition that causes the turbo rack phenomenon due to the boost delay, and the minimum opening EGR valve duty is determined to prevent the EGR supply interruption. The mixer condition control map 12 is provided with a lambda correction value depending upon the monitoring result of the lambda sensor 6c activated for resolving the mixer condition that causes the over-rich phenomenon of a ratio of the air/fuel with respect to the cylinder of the engine 7, and the minimum opening EGR valve duty is corrected to enhance the safety of EGR supply. The external factor condition control map 13 is provided with a table for each of cooling water temperature, an air amount, and a gear stage in order to resolve the external factor condition generated by the cold state or the high altitude environment and the gear stage, and the minimum opening EGR valve duty is corrected to enhance the safety of the EGR supply.

For example, the duty output unit 20 outputs a control signal of the controller 10 to the actuator of the EGR valve 3. In this case, the control signal is generated by a Pulse Width Modulation (PWM) duty.

Hereinafter, the valve duty differentiated EGR control method of FIGS. 1 and 2 will be described in detail with reference to FIGS. 3 to 5. In this case, the control subject is the controller 10, and the controlled object is the EGR valve 3 (i.e., the actuator).

The controller 10 performs detecting the EGR valve duty correction variable and classifying the EGR control condition S10 as the operation S1 of the EGR system 1 is performed, and then performs the operation region condition control S20, the mixer condition control S30, and the external factor condition control S40, respectively. As a result, the operation region condition control S20, such as in S20-1, calculates an EGR valve duty (A) (i.e., the target air amount EGR valve duty) S25, a minimum opening EGR valve duty (B) S26, an engine operation region EGR valve duty (C) S27, and a full load operation range lambda correction value (K) [e.g., (K=C×D)] S28; a mixer condition control S30, such as in S30-1, calculates a lambda duty correction coefficient (D); and the external factor control S40, such as in S40-1, calculates an atmospheric pressure duty correction coefficient (E), a cooling water temperature duty correction coefficient (F), and a gear stage duty correction coefficient (G) as an auxiliary duty correction coefficient, respectively.

Figure 4:
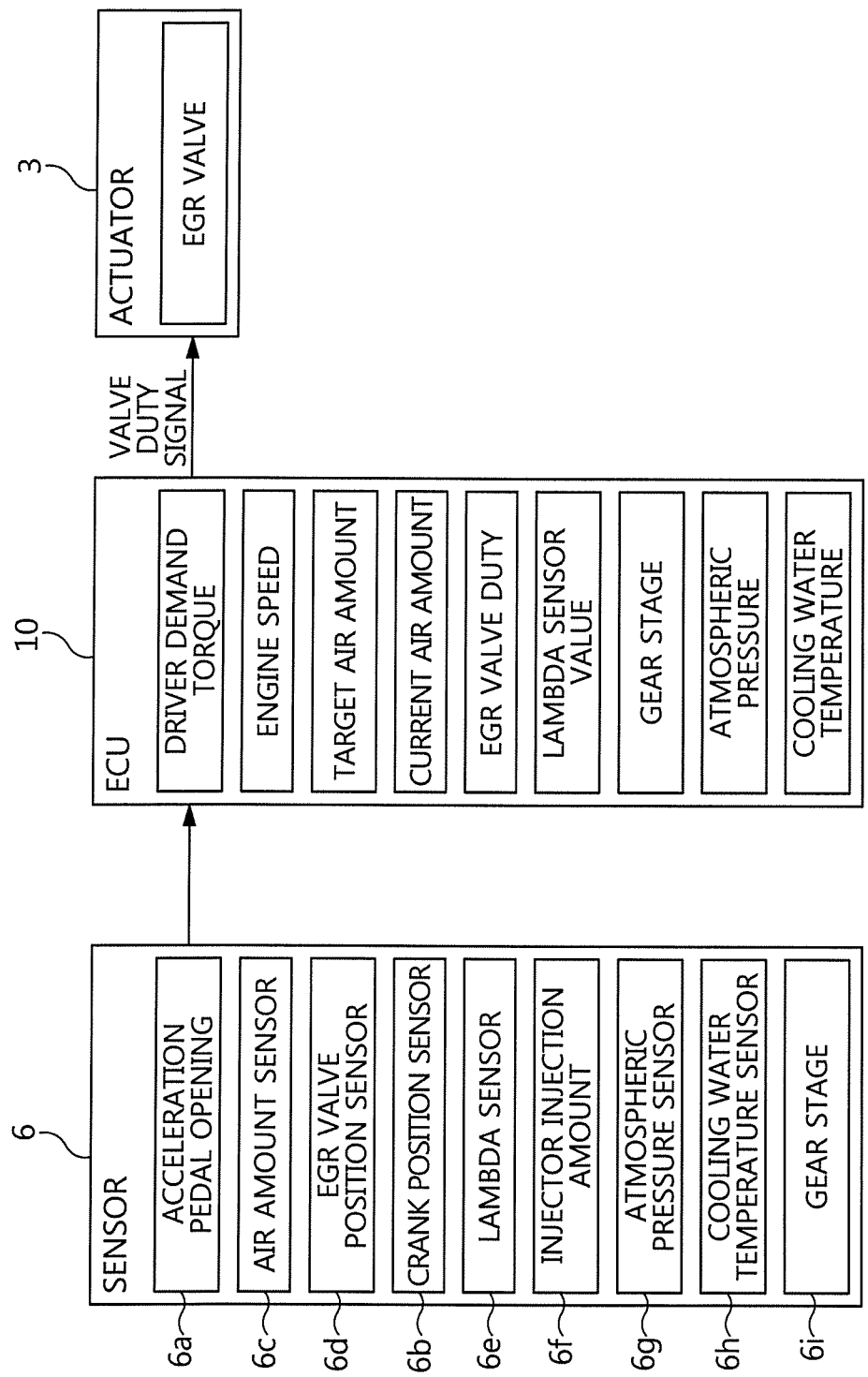
FIG. 4 is an example of an EGR valve control operation of a controller applied to the EGR system in accordance with an exemplary embodiment of the present disclosure.

Referring to FIG. 4, the detecting the EGR valve duty correction variable is performed by reading the data of the sensor 6 in the controller 10. For example, the controller 10 reads the respective detection values transmitted from the APS 6a, the crank position sensor 6b, the air amount sensor 6c, the EGR valve position sensor 6d, the lambda sensor 6e, the injector sensor 6f, the atmospheric pressure sensor 6g, the cooling water temperature sensor 6h, and the shifting sensor 6i, and checks the state of the engine 7 at the timing of the operation of the EGR system based on a driver demand torque, an engine speed (i.e., a RPM), a target air amount, current air amount, an EGR valve duty, a lambda sensor value, a gear stage, atmospheric pressure, cooling water temperature that are confirmed from these values, and then outputs a control signal for controlling the actuator to the EGR valve 3.

Figure 5:
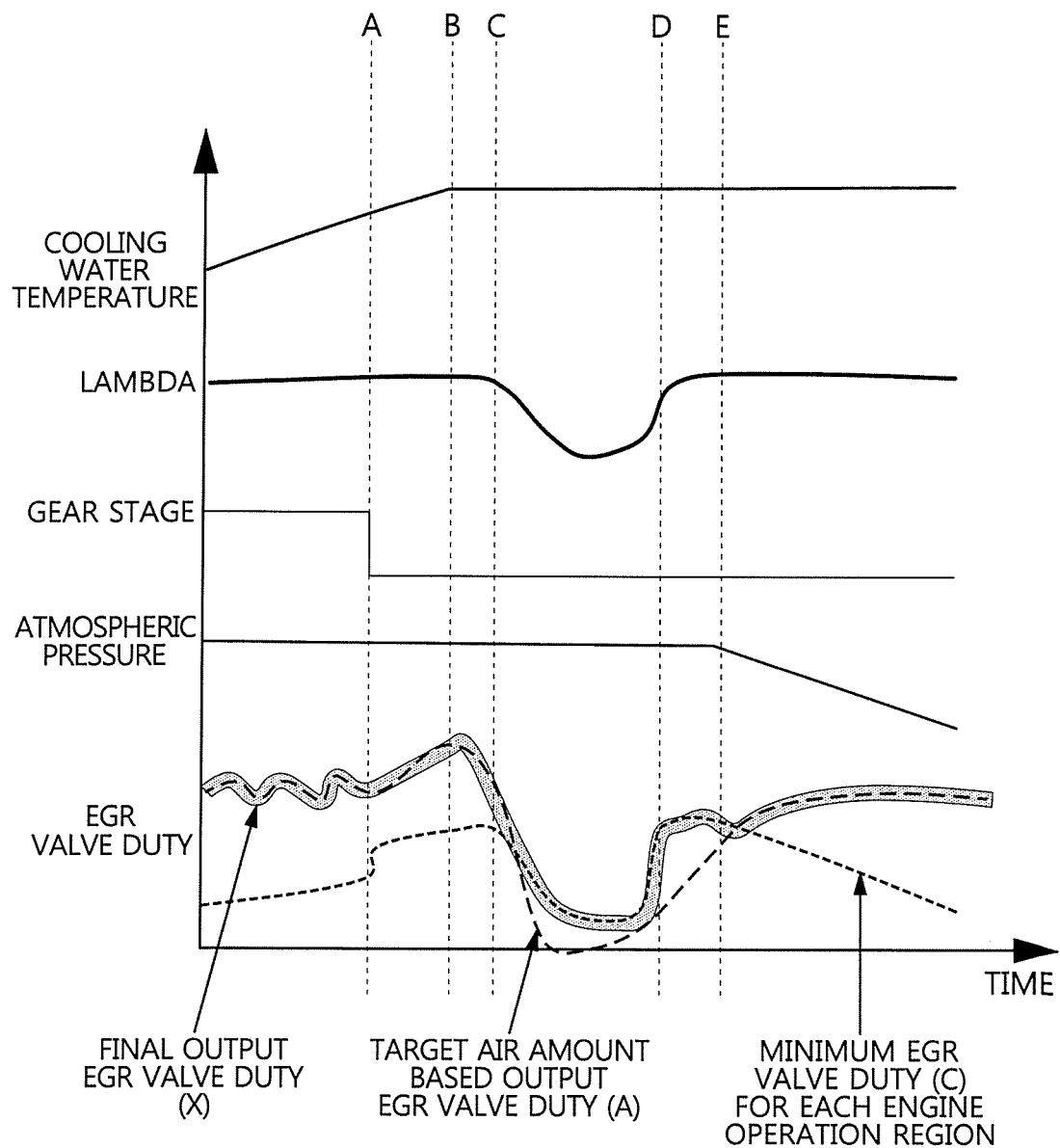
FIG. 5 is an example of a line diagram of the EGR valve duty for differentiating the valve duty in accordance with an exemplary embodiment of the present disclosure.

Referring to FIG. 5, it is illustrated how to determine the minimum EGR valve duty (i.e., the minimum opening EGR valve duty or the corrected minimum opening EGR valve duty) and a final output EGR valve duty depending upon the lambda/cooling water temperature/gear stage/atmospheric pressure.

The meaning of the ranges "A-B-C-D-E" for determining the minimum EGR valve duty is as follows.

The minimum EGR valve duty can be increased because the cooling water temperature is increasing up to the range "A." This is because as the cooling water temperature generally increases, the combustion stability becomes better, and accordingly, even if more EGR is supplied, there is no problem in combustion stability. In this case, although the EGR valve duty correction coefficient value depending on the cooling water temperature can be variously used depending on the setting thereof, generally, the EGR valve duty correction coefficient value is also increased upon the increase, and generally uses the value smaller than 1 as the warm-up degree is lowered at 1 applied in the full warm-up.

In the range "B-C," the minimum EGR valve duty can be variously set as the gear stage is lowered up to the timing of "B," and the cooling water temperature continuously increases up to the timing of "C," such that the minimum EGR valve duty can be increased.

In the range "C-D," the lambda value is reduced and then increased again, such that the EGR valve duty correction coefficient is set so that the minimum EGR valve duty is simultaneously lowered when the lambda is lowered, while the EGR valve duty correction coefficient should be set so that the minimum EGR valve duty is conversely increased when the lambda is increased. The reason is for considering the generation of the engine combustion (e.g., the diesel engine) in the lean condition that the lambda is equal to or greater than 1 to consider that the combustion stability and the smoke generation amount are sharply deteriorated when the lambda is equal to or less than 1, or about 1.

After the range "E," the atmospheric pressure is lowered and thereby the air is lean, such that the EGR valve duty correction coefficient should be set so that the minimum EGR valve duty is lowered considering a lack of the air required for the combustion.

Accordingly, the final EGR valve duty is selected as a larger value of the EGR valve duty (i.e., the target air amount EGR valve duty) and the minimum EGR valve duty (i.e., the minimum opening EGR valve duty or the corrected minimum opening EGR valve duty) that are calculated and outputted based on the target air amount. Accordingly, although the final EGR valve duty is outputted from the controller 10 to the EGR valve 3, it is possible to prevent the effective cross-sectional area of the EGR supply line 5 from being completely closed by the EGR valve 3.

Referring again to FIGS. 1 and 2, the controller 10 performs determining the full load operation range S50. This is because the fuel amount for the target output is limited in the full load operation range of the engine equipped with the turbocharger, and accordingly, the target boost pressure is provided. Accordingly, the determining the full load operation range S50 is performed by applying the operation range of the engine 7 exceeding the setting fuel amount matched with the EGR valve duty (A) S25 of the operation region condition control S20 as a condition.

As a result, in the determining the full load operation range S50, when it is the operation range condition of the setting fuel amount, it is entered into the valve duty selection control S60, while when it is the exceeding operation range condition of the setting fuel amount, it is switched into the valve duty reliability establishment control S70.

Then, the controller 10 performs calculating the minimum EGR valve duty S61, determining an EGR valve duty maintenance condition S62, outputting the EGR valve duty (A) S63-1 or outputting the minimum EGR valve duty (H) (i.e., the minimum opening EGR valve duty) S63-2 with respect to the valve duty selection control S60.

In this case, the calculating the minimum EGR valve duty S61 applies the following minimum duty calculation formula. The EGR valve duty maintenance condition S63 applies the duty maintenance condition formula, and it also includes the condition of applying the EGR valve duty (A) as the EGR valve target duty S80 of the valve duty reliability establishment control S70.

Minimum duty calculation formula: $H = B \times D \times E \times F \times G$

Duty maintenance condition formula: $A > H$

Herein, the "H" refers to the minimum EGR valve duty (i.e., the minimum opening EGR valve duty), the "B" to the minimum opening EGR valve duty, the "D" to the lambda duty correction coefficient, the "E" to the atmospheric pressure duty correction coefficient, the "F" to the cooling water temperature duty correction coefficient, the "G" to the gear stage duty correction coefficient, and the "A" to the EGR valve duty (i.e., the target air amount EGR valve duty). The "x" refers to the multiplication sign of two values, and the ">" to the inequality indicating the magnitude relation of two values.

Accordingly, the minimum EGR valve duty (H) is calculated considering all of the minimum opening EGR valve duty (B), the lambda duty correction coefficient (D), the atmospheric pressure duty correction coefficient (E), the cooling water temperature duty correction coefficient (F), and the gear stage duty correction coefficient (G). The duty maintenance condition is determined by the magnitude of the EGR valve duty (A) that is greater or smaller than the minimum EGR valve duty (H), such that the output of the EGR valve duty (A) S63-1 is performed when it is greater than the minimum EGR valve duty (H), while the output of the minimum EGR valve duty (H) S63-2 is performed when it is greater than the EGR valve duty (A).

Accordingly, the EGR valve operation S2 through the valve duty selection control S60 is performed by the EGR valve duty (A) S63-1 or the minimum EGR valve duty (H) S63-2, such that the effective cross-sectional area of the EGR supply line 5 is prevented from being completely closed by the EGR valve 3.

On the other hand, the controller 10 performs the determining the output of the EGR valve target duty (i.e., the EGR valve duty (A)) S80 and outputting an EGR valve lambda target duty (a) S90 with respect to the valve duty reliability establishment control S70.

Accordingly, the EGR valve operation S2 through the valve duty reliability establishment control S70 is performed by the EGR valve lambda target duty (a) S90, such that the effective cross-sectional area of the EGR supply line 5 is prevented from being completely closed by the EGR valve 3.

Figure 6:
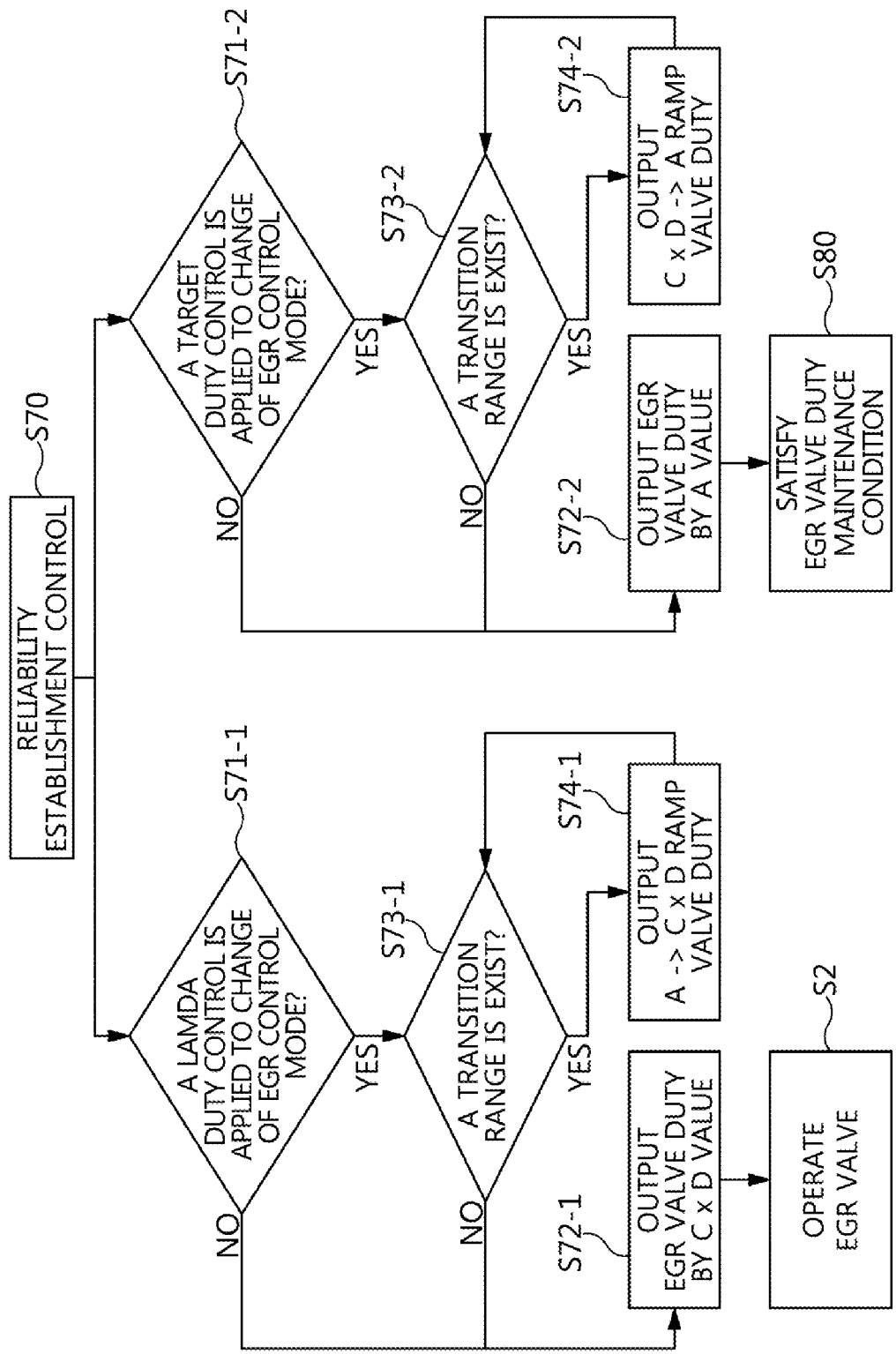
FIG. 6 is a flowchart of a reliability establishment control of the valve duty differentiated EGR control in accordance with an exemplary embodiment of the present disclosure.

Referring to FIG. 6, the valve duty reliability establishment control S70 is for the EGR valve duty correction considering the change in the EGR control mode, and is classified into lambda duty controls S71-1 to S74-1 to which the full load operation range is applied and target duty controls S71-2 to S74-2 to which the full load operation range is not applied.

Figure 7:
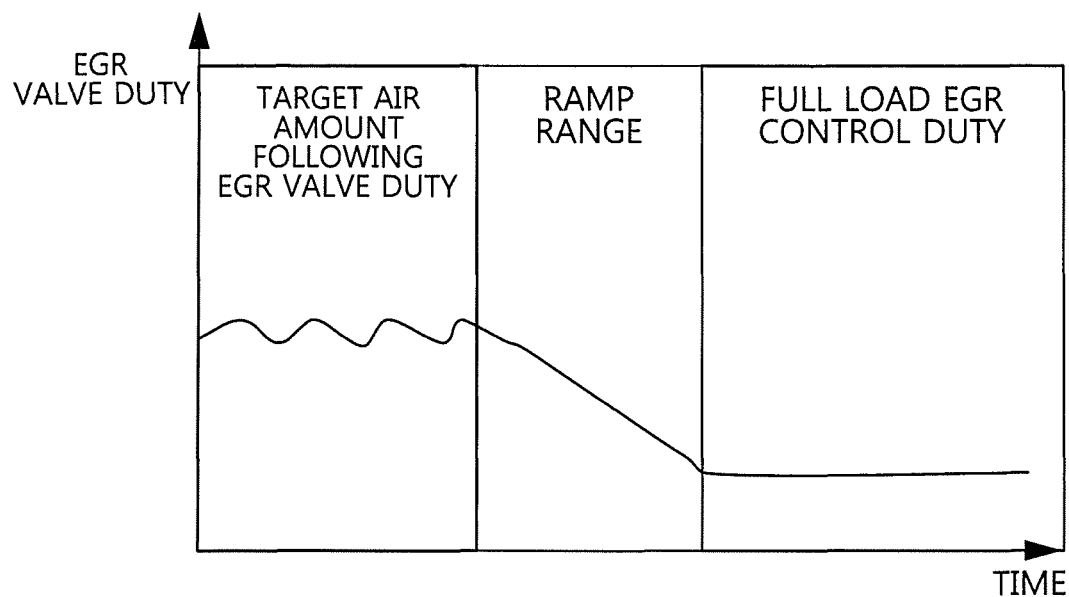
FIG. 7 is an example of a change in an EGR control mode of the reliability establishment control in accordance with an exemplary embodiment of the present disclosure.

Referring to FIG. 7, the EGR control severely occurs the profile of the EGR valve duty causing the combustion instability and operation problem of the engine when the EGR valve duty is controlled depending upon the target air amount and then after entering into the full load region, is controlled by a fixed EGR valve duty or vice versa. Accordingly, the EGR control mode requires a transition range (i.e., a Ramp Range) between a target air amount following EGR valve duty control mode and a full load EGR valve duty control mode, and the transition range (i.e., the Ramp Range) can resolve the profile problem due to the transition by the ramp output, thus smoothing the operation of the EGR valve and enhancing the combustion instability problem of the engine.

Accordingly, the lambda duty controls S71-1 to S74-1 reflect when changing from the target air amount following EGR valve duty control mode into the full load EGR valve duty control mode or vice versa, and the target duty controls S71-2 to S74-2 reflect when being maintained as the target air amount following EGR valve duty control mode.

Referring again to FIG. 6, the lambda duty controls S71-1 to S74-1 and the target duty controls S71-2 to S74-2 are implemented as follows.

For example, the lambda duty controls S71-1 to S74-1 perform determining whether or not the EGR control mode is an EGR control mode invariant condition or an EGR control mode change condition S71-1, changing the output into the EGR valve lambda target duty (a) S90 in the EGR control mode invariant condition S71-1 or the non-existence of a transition range (i.e., a Ramp Range) S72-1, confirming the existence of the transition range (i.e., a Ramp Range) S73-1, changing the EGR valve duty for outputting the EGR valve lambda target duty (a) S90 in the existence of the transition range (i.e., the Ramp Range) S74-1.

Particularly, the changing the EGR valve duty S74-1 is repeated until the non-existence of the transition range (i.e., the Ramp Range) S73-1 is confirmed, and for this purpose, applies the method that the EGR valve target duty (i.e., the EGR valve duty (A)) is replaced with the EGR valve lambda target duty (a) S90 obtained by multiplying the engine operation region EGR valve duty (C) by the lambda duty correction coefficient (D). Accordingly, the EGR valve lambda target duty (a) S90 is equal to the full load operation range lambda correction value (K) S28.

For example, the target duty controls S71-2 to S74-2 perform determining whether or not the EGR control mode is the EGR control mode invariant condition or the EGR control mode change condition S71-2, maintaining the output as the EGR valve target duty (i.e., the EGR valve duty (A)) S80 in the EGR control mode invariant condition S71-2 or the non-existence of a transition range (i.e., a Ramp Range) S72-2, confirming the existence of the transition range (i.e., a Ramp Range) S73-2, changing the EGR valve target duty (i.e., the EGR valve duty (A)) S80 for outputting the EGR valve lambda target duty (a) S90 in the existence of the transition range (i.e., the Ramp Range) S74-2.

Particularly, the changing the EGR valve duty S74-2 is repeated until the non-existence of the transition range (i.e., the Ramp Range) S73-2 is confirmed, and for this purpose, applies the method that the EGR valve lambda target duty (a) S90 obtained by multiplying the engine operation region EGR valve duty (C) by the lambda duty correction coefficient (D) is replaced with the EGR valve target duty (i.e., the EGR valve duty (A)). Accordingly, the EGR valve lambda target duty (a) S90 is equal to the full load operation range lambda correction value (K) S28.

The operation region condition control S20, the mixer condition control S30, and the external factor condition control S40 in FIGS. 1 and 2 are explained with reference to FIGS. 8 to 11.

Figure 8:
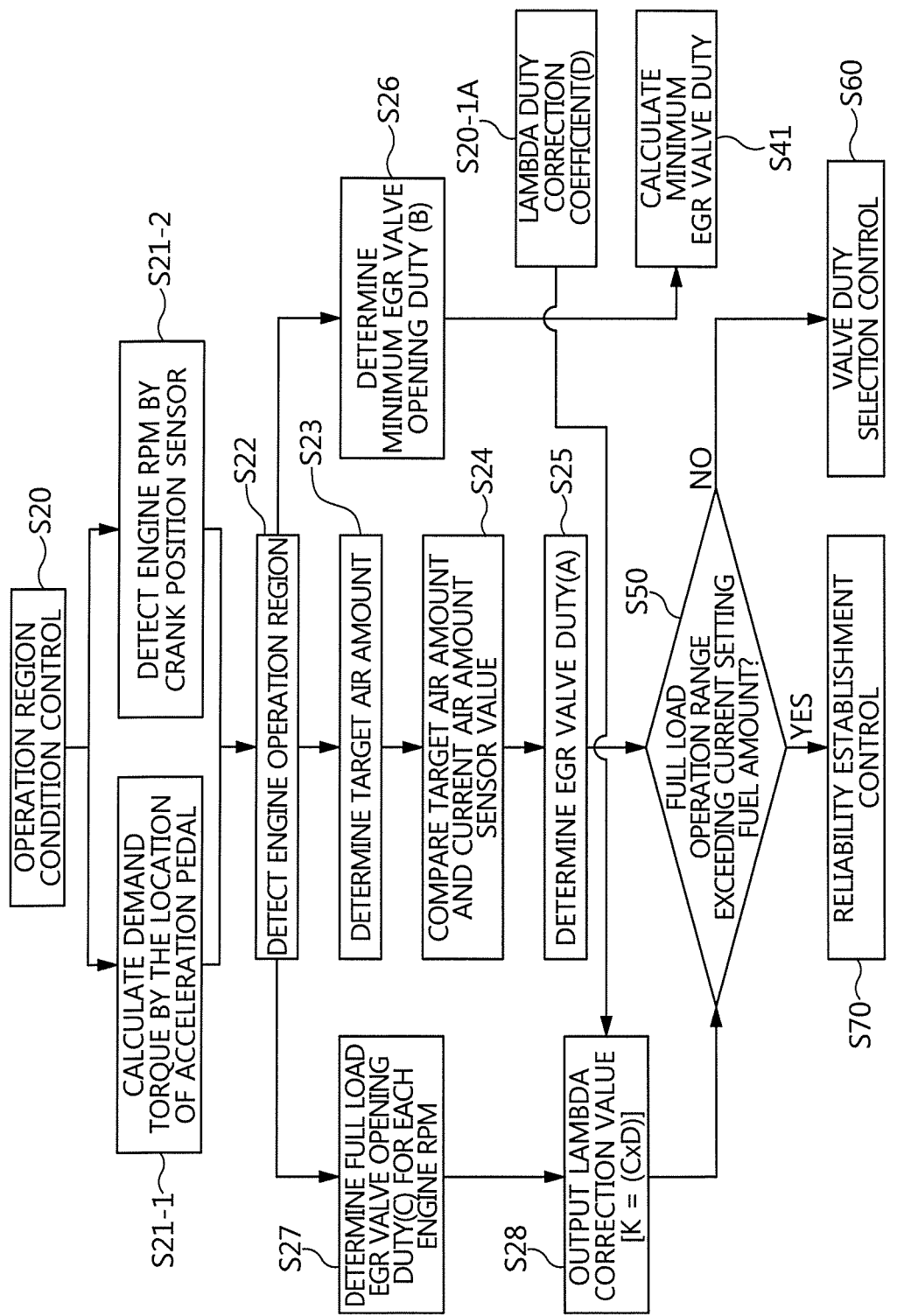
FIG. 8 is a flowchart of the operation region condition control of the valve duty differentiated EGR control in accordance with an exemplary embodiment of the present disclosure.

Referring to FIG. 8, the operation region condition control S20 calculates (or detects) the driver demand torque depending upon the location of the acceleration pedal S21-1 and the engine RPM by the location of the crank position S21-2, respectively, detects the engine operation region based on the driver demand torque S21-1 and the engine RPM S21-2 S22, and performs determining the air target amount S23, comparing the target air amount and the current air amount S24, and determining the EGR valve duty (A) S25.

Particularly, the detecting the engine operation region S22 performs determining the minimum opening EGR valve duty (B) S26, and the minimum opening EGR valve duty (B) is used in calculating the minimum EGR valve duty S61. In addition, the detecting the engine operation region S22 performs determining the engine operation region EGR valve duty (C) S27, and outputting the full load operation range lambda correction value (K) S28. In this case, the engine operation region EGR valve duty (C) is used for the full load operation range lambda correction value (K), and the full load operation range lambda correction value (K) is calculated by multiplying the engine operation region EGR valve duty (C) by the lambda duty correction coefficient (D)

of the mixer condition control S30, and is accordingly equal to the EGR valve lambda target duty (a) S90.

Referring to FIG. 4, the controller 10 recognizes the engine speed of the engine 7 by the crank position sensor 6b, calculates the driver demand torque from the opening of the acceleration pedal 8 recognized by the APS 6a to determine the engine fuel injection amount of the injector 7-1, calculates the target air amount depending upon the engine speed and the fuel injection amount, and checks the current air amount by the air amount sensor 6c to determine the EGR valve control duty (i.e., the target air amount EGR valve duty) depending upon the comparison of the target air amount and the current air amount.

Figure 9:
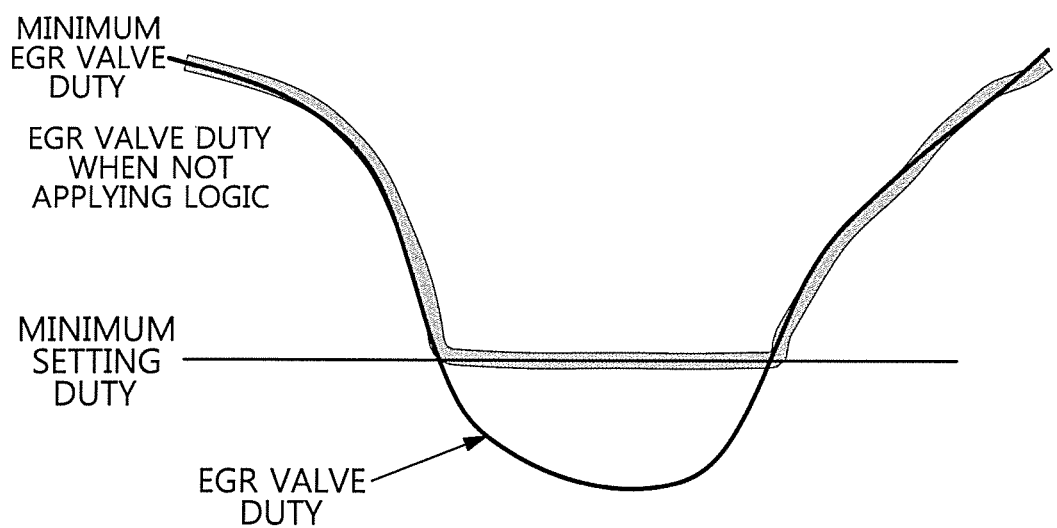
FIG. 9 is an example of the minimum setting duty applied line diagram of the EGR valve in accordance with an exemplary embodiment of the present disclosure.

Referring to FIG. 9, the difference of the EGR valve duty (A) and the minimum opening EGR valve duty (B) or the EGR valve lambda target duty (a) can be known.

As illustrated, when the EGR control is performed by the method for following the target air amount, the formation of the boost pressure is delayed by the turbo rack in the acceleration or rapid acceleration, such that the actual air amount does not reach the target air amount because the EGR supply cannot be supplied by the upward of the target air amount in the high load. Accordingly, the EGR valve 3 is closed by the EGR valve duty (i.e., the EGR valve duty (A)) outputted at the minimum setting duty or less, such that the phenomenon of the EGR supply interruption in which NOx peak is caused can be caused. However, the minimum EGR valve duty (i.e., the minimum opening EGR valve duty (B) or the EGR valve lambda target duty (a)) is set to be higher than the minimum setting duty, such that the minimum EGR supply can be maintained even when the air amount is lower than the target air amount, thus preventing the phenomenon of the EGR supply interruption in which NOx peak is caused.

Figure 10:
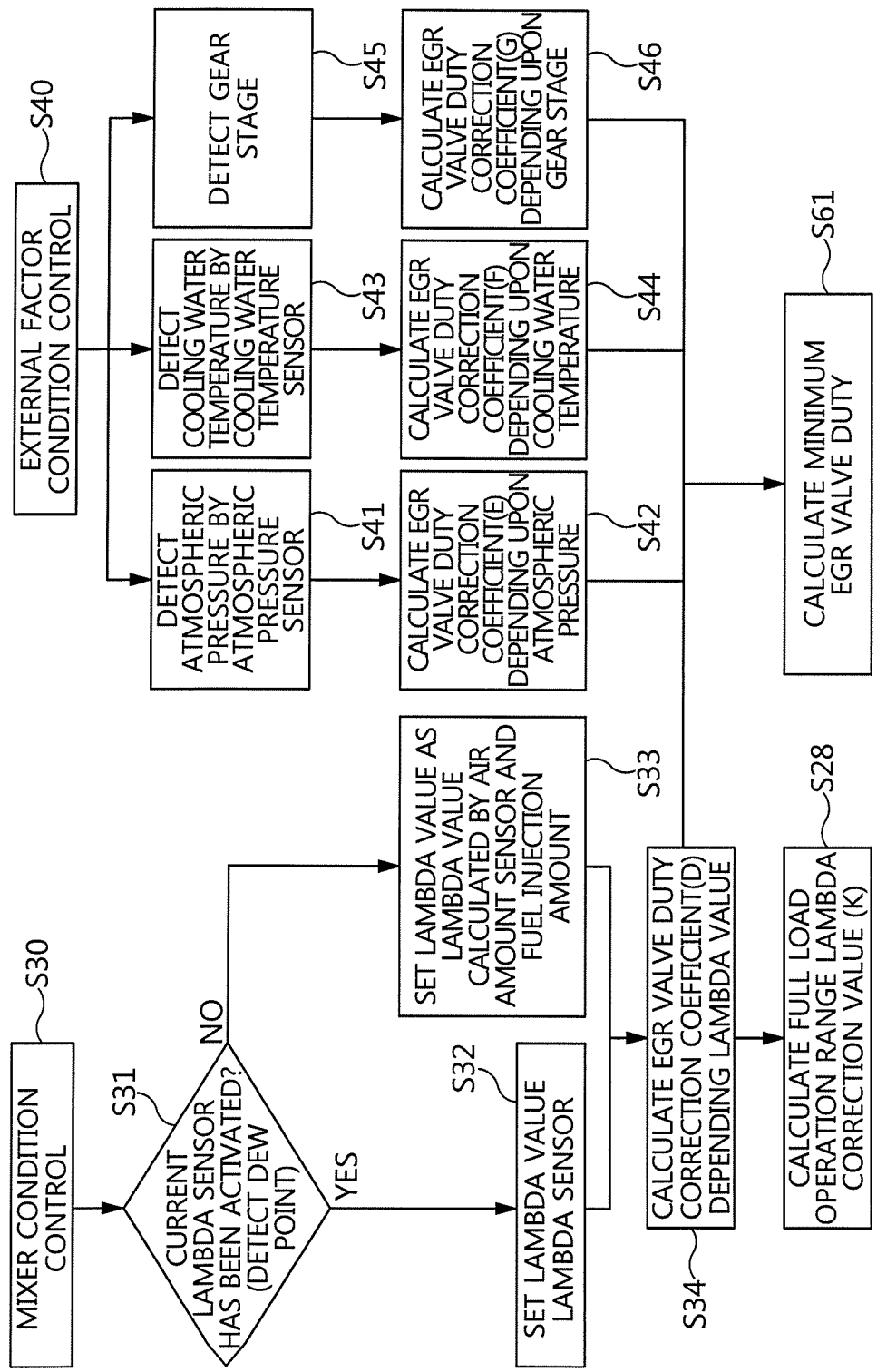
FIG. 10 is a flowchart of the mixer condition control and the external factor condition control of the valve duty differentiated EGR control in accordance with an exemplary embodiment of the present disclosure.
Figure 11A:
FIGS. 11A-11D are examples of a lambda correction line diagram of the mixer condition control and a correction line diagram for each of cooling water temperature, atmospheric pressure, and a gear stage of the external factor condition control in accordance with an exemplary embodiment of the present disclosure.
Figure 11B:
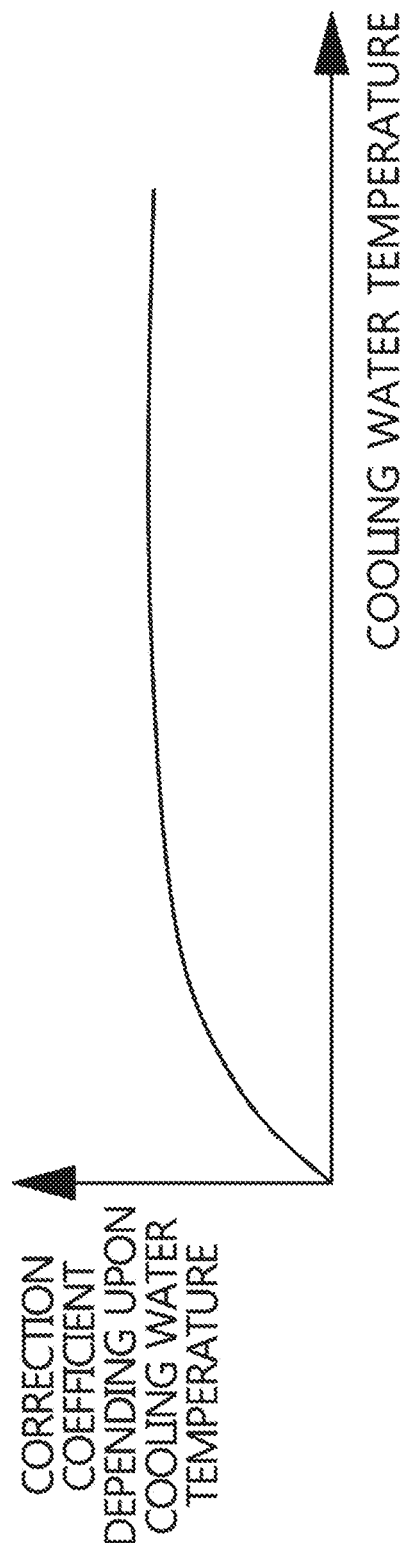
Figure 11C:
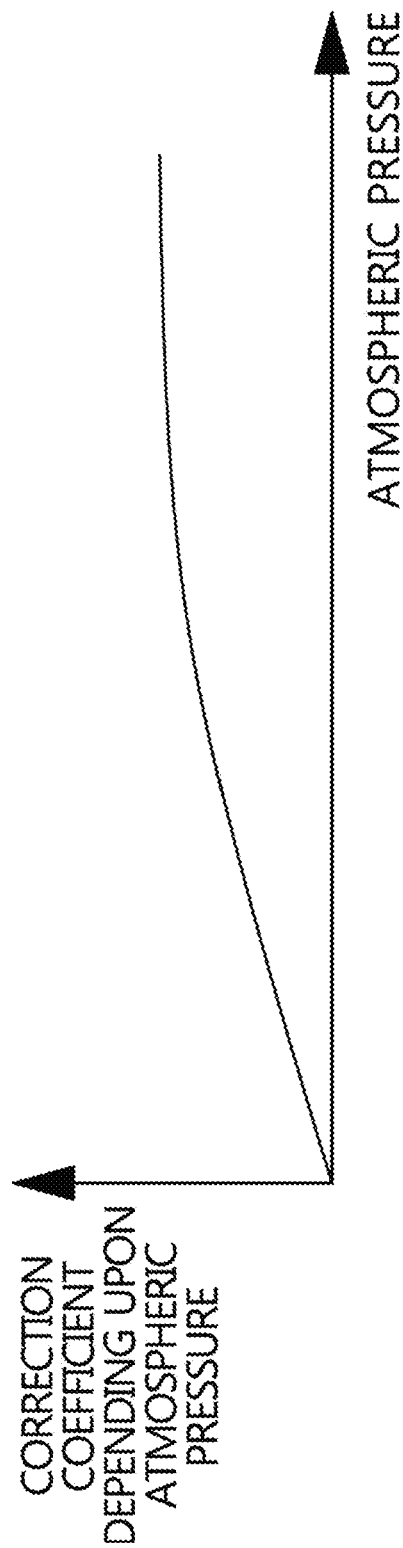
Figure 11D:
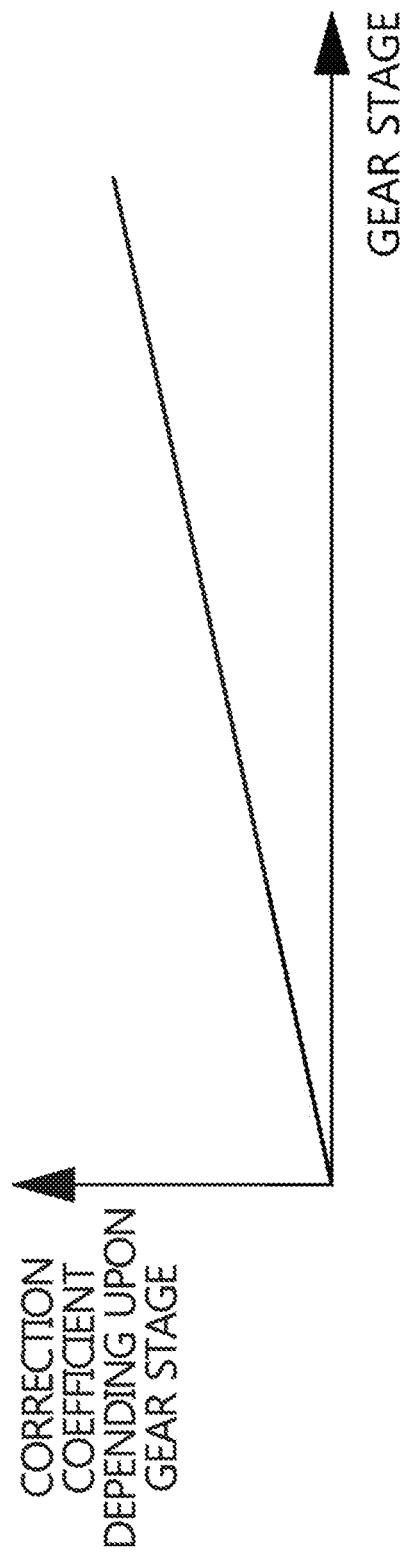

Referring to FIG. 10, the mixer condition control S30 and the external factor condition control S40 are performed as follows.

For example, the mixer condition control S30 performs determining a lambda sensor activation using a dew point S31, setting a lambda sensor value applying a lambda sensor signal depending upon the detection of the dew point S31, S32, setting a lambda calculation value applying the air amount sensor signal and the fuel injection amount depending upon non-detection of the dew point S31 S33, and calculating the lambda duty correction coefficient (D) depending upon the lambda sensor value S32 or the lambda calculation value S33, S34.

As a result, the lambda duty correction coefficient (D) S34 is used for outputting the full load operation range lambda correction value (K) S28 of the operation region condition control S20 and calculating the minimum EGR valve duty S61 of the valve duty selection control S60.

For example, the external factor condition control S40 performs detecting atmospheric pressure by the atmospheric pressure sensor 6g S41, calculating the atmospheric pressure duty correction coefficient (E) depending upon the atmospheric pressure S42, detecting cooling water temperature by the cooling water temperature sensor 6h, calculating the cooling water temperature duty correction coefficient (F) depending upon cooling water temperature S44, detecting the gear stage by the gear stage sensor 6i S45, and calculating the gear stage duty correction coefficient (G) depending upon the gear stage S46.

As a result, the atmospheric pressure duty correction coefficient (E) S42, the cooling water temperature duty correction coefficient (F) S44, and the gear stage duty correction coefficient (G) S46 are used for the calculating the minimum EGR valve duty S61 of the valve duty selection control S60.

Referring to FIGS. 11A-11D, the minimum EGR valve duty (H) and the full load EGR valve duty correction coefficient (the EGR valve lambda target duty (a)) depending upon the lambda/cooling water temperature/gear stage/atmospheric pressure are illustrated.

A lambda line diagram to which the lambda duty correction coefficient (D) is applied indicates that when a ratio of the fuel/air mixture in the cylinder is excessively rich in the low lambda condition to further supply the EGR, the combustion and the smoke emission can be further deteriorated, thus reducing the EGR supply amount. As a result, the lambda line diagram indicates that does not cause combustion instability and excessive smoke generation when the air is lean due to the lowered lambda and that is severe.

An atmospheric pressure line diagram to which the atmospheric pressure duty correction coefficient (E) is applied indicates that the EGR supply amount reduces as the atmospheric pressure reduces. As a result, the atmospheric pressure line diagram indicates that ensures combustion stability even when the air density reduces due to the lowered atmospheric pressure and the air amount required for combustion reduces.

The cooling water temperature line diagram to which the cooling water temperature duty correction coefficient (F) is applied indicates that the EGR supply amount reduces in the cold state. As a result, the cooling water temperature line diagram indicates that can prevent combustion instability caused by the combustion temperature a lot lowered due to low cooling water temperature.

The gear stage line diagram to which the gear stage duty correction coefficient (G) is applied indicates that can prevent torque reduction by ensuring the freedom degree of the EGR supply depending upon the gear stage that changes the degree of the increase speed of the engine speed depending on the vehicle.

As described above, the EGR control method applied to the EGR system 1 in accordance with the present embodiment implements the valve duty differentiated control that detects the operation region to which the acceleration is applied, the mixer to which the air-fuel rich is applied, and the external factor to which the cooling water temperature, the high latitude, and the gear stage are applied through the controller 10, and calculates the EGR valve duty, which is set by the target air amount to the intake air amount, by the minimum EGR valve duty (H) depending upon the valve control conditions to apply it as the EGR valve duty for the EGR valve 3, thus preventing the EGR supply interruption that is the cause of the excessive NOx Peak by the dualization of the EGR valve duty through the minimum opening EGR valve duty (B) and the minimum EGR valve duty (H) through the correction coefficient, and further preventing the combustion instability, the torque reduction, and the over-smoke phenomenon.

What is claimed is:

1. An exhaust gas recirculation (EGR) system, comprising:
a controller for implementing a valve duty differentiated control,
wherein the valve duty differentiated control:
detects an operation region to which acceleration is applied, a mixer region to which a ratio of an air-fuel is applied, and an external factor region to which a cooling water temperature, an air-lean environment condition, and a gear stage are applied as a valve control condition, respectively;
determining whether or not an EGR valve duty and the minimum EGR valve duty are applied; and
calculates an EGR valve duty, which is set by a target air amount to an intake air amount, by a minimum EGR valve duty depending upon the valve control condition and applying the calculated EGR valve duty for an EGR valve when the calculated minimum EGR valve duty is greater than the EGR valve duty.

2. The EGR system of claim 1,
wherein the controller comprises an operation region condition control map, a mixer condition control map, and an external factor condition control map, and
wherein the operation region condition control map includes a target air amount EGR valve duty, an engine operation region EGR valve duty, and a minimum opening EGR valve duty as a table,
the mixer condition control map includes a lambda value for the over-rich of a ratio of the air to fuel as a table, and
the external factor condition control map includes the cooling water temperature, the intake air amount, and the gear stage as a table.

3. The EGR system of claim 1,
wherein the controller is connected with a sensor,
wherein the sensor comprises an accelerator pedal sensor (APS) for detecting an opening degree of an acceleration pedal, a crank position sensor for detecting a rotation location of a crankshaft of an engine, an air amount sensor for detecting fresh air of an intake line connected to the engine, an EGR valve position sensor for detecting the valve opening location of the EGR valve, a lambda sensor for detecting an exhaust gas component of an exhaust line connected to the engine, an injector sensor for detecting fuel injected into each cylinder of the engine, an atmospheric pressure sensor for detecting atmospheric pressure around a vehicle, a cooling water temperature sensor for detecting the cooling water temperature flowing through a cylinder block of the engine, and a shifting sensor for detecting a shifting stage depending upon an operation of a shifting lever.

4. An exhaust gas recirculation gas (EGR) control method, comprising a valve duty differentiated control including:
detecting, by a controller, an engine operation region, a mixer region, and an external factor region as a valve control condition for an EGR valve duty correction variable for controlling an EGR system;
applying, by the controller, the EGR valve duty correction variable to an EGR valve duty, which is set by a target air amount to an intake air amount, to calculate a minimum EGR valve duty in EGR valve duty cycle during engine operation; and
outputting the calculated minimum EGR valve duty to an EGR valve as the EGR valve duty when the calculated minimum EGR valve duty is greater than the EGR valve duty,
wherein the valve duty differentiated control includes:
a condition control for calculating the EGR valve duty correction variable in each of the engine operation region, the mixer region and the external factor region,
a valve duty selection control using an engine operation range suitable for a setting fuel amount, and
a valve duty reliability establishment control using the EGR valve duty correction for changing an EGR control mode in the engine operation range out of the setting fuel amount.

5. The EGR control method of claim 4,
wherein the engine operation region uses acceleration or rapid acceleration as the valve control condition,
the mixer region uses a ratio of air-fuel in a cylinder of an engine as valve control condition, and
the external factor region uses a cooling water temperature, an air-lean environment condition, and a gear stage as valve control condition.

6. The EGR control method of claim 4,
wherein the condition control includes:
an operation region condition control for calculating the EGR valve duty correction variable in the engine operation region;
a mixer condition control for calculating the EGR valve duty correction variable in the mixer region; and
an external factor condition control for calculating the EGR valve duty correction variable in the external factor region.

7. The EGR control method of claim 6,
wherein the operation region condition control calculates a target air amount EGR valve duty, a minimum opening EGR valve duty, an engine operation region EGR valve duty, and an EGR valve lambda target duty as the EGR valve duty correction variable,
the mixer condition control calculates a lambda duty correction coefficient as the EGR valve duty correction variable, and
the external factor condition control calculates an atmospheric pressure duty correction coefficient, a cooling water temperature duty correction coefficient, and a gear stage duty correction coefficient as the EGR valve duty correction variable.

8. The EGR control method of claim 6,
wherein the operation region condition control performs:
detecting the engine operation region by calculating a driver demand torque based on an opening degree of an acceleration pedal;
setting the EGR valve duty by the target air amount to the intake air amount by comparing the target air amount determined in the engine operation region with a current air amount;
determining a minimum opening EGR valve duty that an effective cross-sectional area of an EGR supply line in the engine operation region is not closed by the EGR valve and further determining an engine operation region EGR valve duty depending upon the engine operation region; and
determining the engine operation range depending upon the setting fuel amount by converting the engine operation region EGR valve duty into a full load operation range lambda correction value by a lambda duty correction coefficient of the mixer condition control.

9. The EGR control method of claim 6,
wherein the mixer condition control performs:
determining lambda sensor activation using a dew point;
setting a lambda sensor value applying a lambda sensor signal or a lambda calculation value applying an air amount sensor signal and a fuel injection amount; and
calculating and outputting a lambda duty correction coefficient by the lambda sensor value or the lambda calculation value.

10. The EGR control method of claim 6,
wherein the external factor condition control performs:

calculating and outputting an atmospheric pressure duty correction coefficient depending upon an atmospheric pressure;

calculating and outputting a cooling water temperature duty correction coefficient depending upon a cooling water temperature; and calculating and outputting a gear stage duty correction coefficient depending upon a gear stage.

11. The EGR control method of claim 4, wherein the valve duty selection control performs:

calculating the minimum EGR valve duty by applying the EGR valve duty correction variable;

determining whether or not the EGR valve duty and the minimum EGR valve duty are applied; and determining and outputting the EGR valve duty or the minimum EGR valve duty.

12. The EGR control method of claim 11, wherein the minimum EGR valve duty applies a minimum opening EGR valve duty of the operation region condition control, a lambda duty correction coefficient of the mixer condition control, an atmospheric pressure duty correction coefficient of the external factor condition control, a cooling water temperature duty correction coefficient, and a gear stage duty correction coefficient.

13. The EGR control method of claim 12, wherein the minimum EGR valve duty is calculated by multiplying the minimum opening EGR valve duty, the lambda duty correction coefficient, the atmospheric pressure duty correction coefficient, the cooling water temperature duty correction coefficient, and the gear stage duty correction coefficient altogether.

14. The EGR control method of claim 4, wherein the valve duty reliability establishment control includes:

a lambda duty control in which the engine operation range is applied and an EGR control mode is considered to output an EGR valve lambda target duty to the EGR valve; and a target duty control in which the engine operation range is not applied and the EGR control mode is considered to output the EGR value duty to the valve duty selection control.

15. The EGR control method of claim 14, wherein the lambda duty control performs:

determining the EGR control mode by an EGR control mode invariant condition and an EGR control mode change condition;

confirming a transition range in the EGR control mode change condition;

outputting the EGR valve lambda target duty by an engine operation region EGR valve duty of the operation region condition control and a lambda duty correction coefficient of the mixer condition control among the condition controls in the EGR control mode invariant condition or the non-existence condition of the transition range; and changing the EGR valve duty into the EGR valve lambda target duty in an existence condition of the transition range.

16. The EGR control method of claim 15, wherein the EGR valve duty is changed into the EGR valve lambda target duty by multiplying the engine operation region EGR valve duty and the lambda duty correction coefficient of the mixer condition control.

17. The EGR control method of claim 14, wherein the target duty control performs:

determining the EGR control mode by an EGR control mode invariant condition and an EGR control mode change condition;

confirming the transition range in the EGR control mode change condition;

outputting the EGR valve duty in the EGR control mode invariant condition or the non-existence condition of the transition range; and changing the EGR valve lambda target duty into the EGR valve duty in the existence condition of the transition range.

18. The EGR control method of claim 17, wherein the EGR valve lambda target duty is changed into the EGR valve duty by multiplying the engine operation region EGR valve duty and the lambda duty correction coefficient of the mixer condition control.

* * * * *